United States Patent [19]
Henry et al.

[11] Patent Number: 5,983,344
[45] Date of Patent: *Nov. 9, 1999

[54] COMBINING ALU AND MEMORY STORAGE MICRO INSTRUCTIONS BY USING AN ADDRESS LATCH TO MAINTAIN AN ADDRESS CALCULATED BY A FIRST MICRO INSTRUCTION

[75] Inventors: G. Glenn Henry; Terry Parks, both of Austin, Tex.

[73] Assignee: Integrated Device Technology, Inc., Santa Clara, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/820,576
[22] Filed: Mar. 19, 1997
[51] Int. Cl.[6] .................................................. G06F 9/28
[52] U.S. Cl. .............................................. 712/245
[58] Field of Search .................... 395/595, 596, 395/597, 598; 712/245, 246, 247, 248

[56] References Cited

U.S. PATENT DOCUMENTS

| | | | |
|---|---|---|---|
| 4,090,648 | 5/1978 | Asano et al. ............................ | 395/595 |
| 4,654,786 | 3/1987 | Cochran et al. ......................... | 395/595 |
| 5,046,040 | 9/1991 | Miyoshi .................................. | 395/595 |
| 5,317,701 | 5/1994 | Reininger et al. ....................... | 395/375 |

OTHER PUBLICATIONS

Hamacher et al., *Computer Organization, Second Edition*, McGraw–Hill Series in Computer Organization and Architecture, pp. 146–158, 1984.

*Primary Examiner*—Richard L. Ellis
*Attorney, Agent, or Firm*—James W. Huffman

[57] ABSTRACT

An apparatus and method for improving the execution speed of macro instructions which have an operand located in memory, and where the destination of the result is in memory. The apparatus includes an ALU Store which monitors micro instructions generated by a translator. When a macro instruction is fetched which has an operand located in memory, and the result is to be stored in the same location in memory, the translator generates a LOAD micro instruction followed immediately by an operation micro instruction which contains STORE indicia, such as a STORE suffix. The ALU Store latches the address created by the LOAD micro instruction, and uses this latched address in the following operation store micro instruction.

8 Claims, 4 Drawing Sheets

FIG. 3 (Prior Art)

Pipeline flow for ADD Instruction

| Cycle | Fetch | Translator | Register | Address | Data | Write Back | |
|---|---|---|---|---|---|---|---|
| 1 | Add [Mem],AX | | | | | | |
| 2 | X | Load [Mem] | | | | | |
| 3 | | Add [Mem],AX | Load [Mem] | | | | |
| 4 | | Store [Mem] | Add [Mem],AX | Load [Mem] | | | |
| 5 | | X | Store [Mem] | Add [Mem],AX | Load [Mem] | | |
| 6 | | | X | Store [Mem] | Add [Mem],AX | Load [Mem] | ⎫ |
| 7 | | | | X | Store [Mem] | Add [Mem],AX | ⎬ 3 clock cycles |
| 8 | | | | | X | Store [Mem] | ⎭ |
| . | | | | | | X | |

FIG. 4

Pipeline flow for ADD.S Instruction

| Cycle | Fetch | Translator | Register | Address | Data | Write Back | |
|---|---|---|---|---|---|---|---|
| 1 | Add [Mem],AX | | | | | | |
| 2 | X | Load [Mem] | | | | | |
| 3 | | Add.S [Mem],AX | Load [Mem] | | | | |
| 4 | | X | Add.S [Mem],AX | Load [Mem] | | | |
| 5 | | | X | Add.S [Mem],AX | Load [Mem] | | |
| 6 | | | | X | Add.S [Mem],AX | Load [Mem] | ⎫ 2 clock |
| 7 | | | | | X | Add.S [Mem],AX | ⎬ cycles |
| 8 | | | | | | X | |

COMBINING ALU AND MEMORY STORAGE MICRO INSTRUCTIONS BY USING AN ADDRESS LATCH TO MAINTAIN AN ADDRESS CALCULATED BY A FIRST MICRO INSTRUCTION

BACKGROUND

1. Field of the Invention

This invention relates in general to the field of instruction execution in computer systems, and more particularly to a method and apparatus for improving the performance of executing macro instructions having a result whose destination is in memory.

2. Description of the Related Art

A microprocessor is an integrated circuit that contains the entire central processing unit (CPU) of a computer on a single chip. It is the heart and brain inside every personal computer.

FIG. 1 illustrates the three major parts of a CPU 100. The register set 102 stores intermediate data used during execution of macro instructions. The arithmetic logic unit (ALU) 104 performs the required micro operations, or micro instructions, for executing the macro instructions. The control unit 106 supervises the transfer of information among the registers and instructs the ALU as to which operation to perform.

The CPU 100 is shown connected to a memory 108 via a bus 110. The memory 108 provides storage for programs to be executed on the CPU 100, as well as for the raw data that needs to be processed and the results of the processing. Also shown connected to the CPU 100 via the bus 110 is I/O control 112. The I/O control provides the physical interface between a user and the CPU 100.

The CPU 100 performs a variety of functions dictated by the type of macro instructions that are incorporated into the computer. Such macro instructions may include: data transfer instructions for moving data, addresses, and other operands into register or memory locations; arithmetic instructions (e.g., add, subtract, multiply, divide); branch instructions for controlling the sequence of instruction execution within the CPU 100; logic instructions (e.g., and, or, not, xor); and shift and rotate instructions. These instructions provide a language interface between a programmer and the CPU 100. They allow the programmer to command the CPU 100 to perform particular tasks, in a specified order. The type of instructions that may be executed on a particular CPU is termed the instruction set.

For convenience, instruction sets typically allow a programmer to define operations for execution on the CPU 100 at a higher level than is actually performed within the CPU 100. The instructions used by a programmer are thus called macro instructions. The macro instructions are retrieved by the CPU 100 from the memory 108, and are decoded by the control unit 106 into a sequence of micro instructions. The sequence of micro instructions are then provided to the ALU 104 for execution. The result of the execution may then be placed in either the register set 102, or may be stored in the memory 108.

One example of a macro instruction that may be written by a programmer is ADD [Mem],AX. This instruction tells the CPU 100 to take the data in a register AX 114 (within the register set 102), add the data to a value at memory location Mem 116 (within the memory 108), and store the result in the memory location Mem 116. While the instruction ADD [Mem],AX may be written as a single macro instruction by a programmer, the instruction must be decoded by the control unit 106 into a sequence of micro instructions for execution by the ALU 104. A micro instruction sequence that performs the operation requested by the macro instruction ADD [Mem],AX is shown below:

LOAD [Mem]
ADD [Mem],AX
STORE [Mem]

The above micro instruction sequence first loads the data that is stored in the memory 108, at location Mem 116, into a temporary register (not shown) within the register set 102 of the CPU 100. One skilled in the art is aware that the ALU 104 can operate only on data within the register set 102, and cannot perform direct operations on data outside of the CPU 100. The data in register AX 114 is then added to the data in the temporary register. The result of the addition is then transferred, or stored, back into the memory 108 at location Mem 116.

If it is assumed that each micro instruction within the CPU 100 requires a minimum of one clock cycle to execute, then from the above it should be clear that the CPU 100 would require at least three clock cycles to execute the ADD [Mem],AX instruction. In many processors that are manufactured today, more than three clock cycles would be required to execute the illustrative macro instruction because one or more of the micro instructions require more than one clock cycle to execute. As the number of micro instructions required to perform a macro instruction increase, and as the number of clock cycles required to perform each micro instruction increases, the time required to execute the macro instruction on the CPU 100 is increases.

The above illustration provides a general overview of the difference between macro instructions which are written by a programmer, and micro instructions which are executed within a microprocessor. More specifically, it is shown that a single macro instruction which has as one of its operands a location in memory generates a sequence of micro instructions which are executed within the microprocessor. Memory must first be accessed to load an operand, the operation must be performed, and memory must be accessed a second time to store the result. One skilled in the art should readily appreciate that this sequence of micro instructions is applicable, not just to an ADD instruction, but to many instructions that have an operand whose location is in memory, and where the destination of the result is also at the location in memory.

SUMMARY

For the foregoing reasons, there is a need for improving the execution performance of macro instructions that have results with a destination in memory. It is therefore an object of the present invention to provide a method and apparatus for improving the execution speed of such macro instructions.

Accordingly, in the attainment of the aforementioned object, it is a feature of the present invention to provide a method for executing a macro instruction having an operand in memory, and a result whose destination is in memory, where the method includes: determining the address for the operand, latching the address, loading the operand into a register, operating on the operand, and thereby producing a result, testing whether the operating detects indicia for storing the result to memory, and if the operating includes the indicia for storing the result to memory, storing the result to memory using the latched address.

In addition, a further feature of the present invention is to provide the method as recited above further including: if the operating does not include the indicia for storing to memory, not using the latched address.

Another feature of the present invention is to provide the method as recited above where the operating performs an operation as specified by an opcode which is associated with the operand. The opcode includes a suffix which indicates whether the result should be stored in the latched address.

A further feature of the present invention is to provide the method as recited above where the operating and storing are combined and executed within a single micro instruction.

Another aspect of the present invention is to provide an instruction sequence for executing a macro instruction having a source operand located at an address in memory, and a result, having a destination at the same address in memory. The instruction sequence includes: a load instruction which designates the address in the memory for retrieving the source operand, and an operating instruction, following the load instruction, for producing the result. The operating instruction includes: an opcode, for specifying the type of operation to be performed on the source operand, and a memory store indicator, associated with the opcode, for specifying whether the result is to be stored at the same address.

It is yet another feature of the present invention to provide the instruction sequence as mentioned above wherein the macro instruction is an instruction for execution by a microprocessor.

Another aspect of the present invention provides a microprocessor for executing instructions, including macro instructions having a source operand at an address in memory, and a result to be stored at the same address in memory. The microprocessor includes: a translator, for translating a macro instruction into micro instructions, a register file, connected to the translator, for storing operands, an addressing system, connected to the register file, and to the memory, for determining an address for the source operand in memory, an arithmetic logic unit, connected to the register file, and to the memory, for retrieving the operands, and the source operand from the register file, for operating on the operands and the source operand, and for producing a result to be stored in the memory, and an ALU store circuit, connected to the addressing system, and to the translator, for monitoring the micro instructions provided by the translator, for latching an address determined by the addressing system, and, upon the occurrence of a predetermined sequence of micro instructions, providing the latched address to the addressing system for storing the result. The predetermined sequence of micro instructions includes: a LOAD instruction for loading the source operand from the memory, and an OPERATE.STORE instruction for operating on the source operand, and for storing the result in memory at the latched address, whereby the OPERATE.STORE instruction causes the arithmetic logic unit to operate on the loaded operand, produce the result, and store the result in the memory at the latched address.

In yet another aspect of the present invention, it is a feature to provide the microprocessor as mentioned above where the ALU store circuit provides the latched address only when the OPERATE.STORE instruction immediately follows the LOAD instruction.

An additional feature of the present invention is to provide the microprocessor as mentioned above where the OPERATE.STORE instruction includes: an opcode, which determines the type of operation performed by the arithmetic logic unit, a plurality of operands, upon which the arithmetic logic unit operates, and a STORE indicia, for indicating whether the result should be stored in memory at the latched address.

An advantage of the present invention is that by combining the OPERATE.STORE function into a single micro instruction, (by providing an ALU store circuit for latching addresses associated with LOAD instructions, monitoring micro instructions to locate OPERATE.STORE instructions which immediately follow the LOAD instructions, and providing latched addresses to the OPERATE.STORE instructions), macro instructions which have operands with a destination in memory can be performed in just two processor clock cycles.

The foregoing has outlined rather broadly the objects, features and technical advantages of the present invention so that the detailed description of the invention that follows may be better understood. Additional features and advantages of the invention will be described hereinafter. Those skilled in the art should appreciate that they can readily use the disclosed conception and specific embodiment as a basis for designing or modifying other structures for carrying out the same purposes of the present invention.

DESCRIPTION OF THE DRAWINGS

These and other objects, features, and advantages of the present invention will become better understood with regard to the following description, and accompanying drawings where:

FIG. 3 is a table illustrating a prior art sequence for executing an ADD instruction within the pipeline processor of FIG. 2.

FIG. 4 is a table illustrating a sequence for executing an ADD instruction according to the present invention.

DETAILED DESCRIPTION

Figure 2:
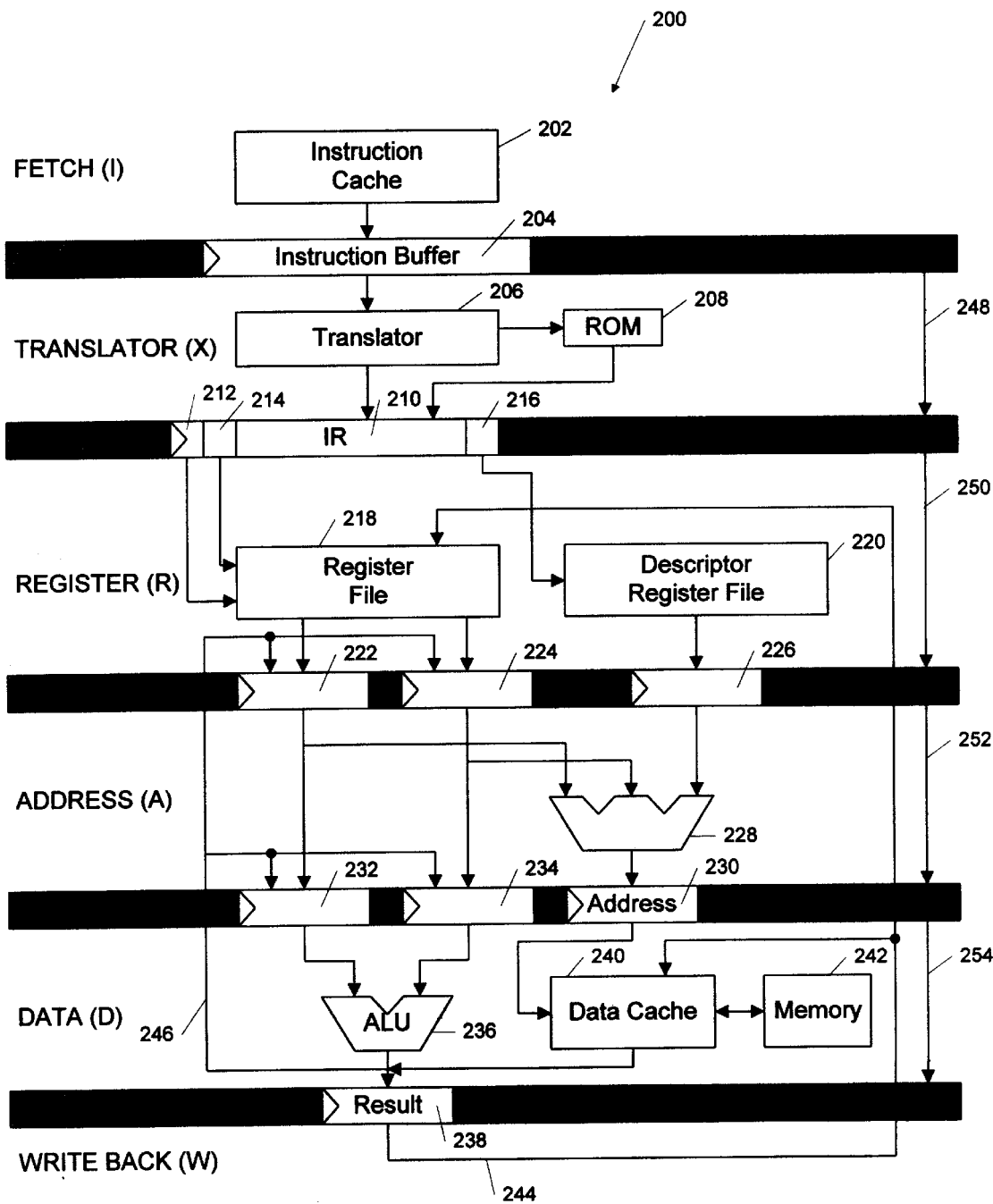
FIG. 2 is a block diagram illustrating the data path of a pipeline processor.

Referring to FIG. 2, a pipeline diagram of a processor 200 which can incorporate the present invention is shown. To better illustrate the novelty of the present invention, the ADD [Mem],AX instruction described in the background will first be discussed with reference to execution on the processor 200. Then, a pipeline processor incorporating the present invention will be shown executing the same macro instruction, but with an improved micro instruction sequence. One skilled in the art will readily appreciate that the use of the ADD [Mem],AX instruction is for illustrative purposes only, and that the embodiment of the present invention as described is also applicable to other operations which have a memory location as an operand and result.

FIG. 2 illustrates a processor 200 which has a six stage pipeline. Pipelining is an implementation technique whereby multiple micro instructions are overlapped in execution. A pipeline is like an assembly line. Each step in a pipeline operates in parallel with other steps, though on a different micro instruction. Like the assembly line, different steps are completing different parts of a macro instruction in parallel. Each of these steps is called a pipe stage or a pipe segment. The stages are connected one to the next to form a pipe-instructions enter at one end, progress through the stages, and exit at the other end. For a more detailed discussion of pipelining, see *Computer Architecture: A Quantitative Approach*, by John L. Hennessy and David A. Patterson, $2^{nd}$ ed.

The stages of the pipeline processor 200 are: 1) fetch; 2) translate/decode; 3) register; 4) address; 5) data; and 6) write back. During the fetch stage, the processor 200 sends out the value in the program counter (not shown) to fetch the next macro instruction from an instruction cache 202 and place the macro instruction into an instruction buffer 204. The instruction buffer 204 holds the macro instruction that will be needed in subsequent clock cycles. Other buffers, registers, etc. may be placed between the fetch stage and the translate/decode stage, or between other stages in the processor 200, as required. However, for ease of illustration, only specific buffer and registers have been called out.

The translate/decode stage reads the macro instruction located in the instruction buffer 204 into the translator 206. The translator 206 decodes the macro instruction into a sequence of micro instructions, and provides the micro instructions, one at a time, to an instruction register 210. Depending on the complexity of the macro instruction, and the goals of the designer, the micro instruction sequence may be provided either directly by the translator 206, by the ROM 208, or by a combination of both.

As shown, the instruction register 210 contains a number of sections 212, 214 and 216 which may be used to store information relating to the operands upon which the micro instructions will operate. These sections are provided to a register file 218 and to a descriptor register file 220 during the register stage of the pipeline. The contents of sections 212, 214 access specific registers in the register file 218 and select the contents of those registers to be output into two temporary registers 222, 224 for use in later clock cycles. Likewise, the contents of section 216 is used to access a particular descriptor register in the descriptor register file 220 which is output into a third temporary register 226. Temporary register 226 is used in later cycles to calculate an address for an operand.

When a micro instruction requires access to a memory location, either for Load or Store operations, the address stage calculates the effective address. The address is calculated by providing the contents of registers 222, 224, and 226 as inputs to an ALU circuit 228. The ALU circuit 228 selects appropriate inputs, and stores the effective address in an address register 230. For micro instructions which do not require calculation of an effective address, the contents of registers 222, 224 are forwarded directly to temporary registers 232, 234 for use in later stages.

During the data stage, one of two operations occur. The first operation provides the contents of the registers 232, 234 as inputs to an ALU 236 for operation thereon. The result of the operation is placed in a result register 238. A second operation occurs when the micro instruction is not an ALU operation, but rather a Load or Store operation from memory. In this instance, the address in register 230 is provided as input to a data cache 240 to load data therefrom. If the operation is a Load, the data in the data cache 240 is placed in the result register 238. If the data does not reside in the data cache 240, the cache 240 accesses a memory 242, retrieves the requested data, and places the data in the result register 238.

During the write back stage, the contents of the result register 238 are written into either the data cache 240 (if a memory operation), or the register file 218 (if a register operation), via signal line 244. Prior to the write back stage, however, the output of the ALU 236 or the data cache 240 are provided on a forward/bypass bus as possible inputs to temporary registers 222, 224, 232, or 234, for use in later processor cycles. Use of the forward/bypass bus allows use of the value in the result register 238 as an input to either the ALU circuit 228, or the ALU 236 on the next processor cycle.

In addition to the buffers and registers called out in FIG. 2, other information relating to micro instructions may be passed from stage to stage along buses 248, 250, 252 and 254. Thus, FIG. 2 shows how an instruction flows through the data path of pipeline processor 200. At the end of each clock cycle, every value computed during that clock cycle and required on a later clock cycle is written into a storage device, which may be a memory 242, a register file 218, or a temporary register.

Now referring to FIG. 3, a table is shown which illustrates the progression of the macro instruction ADD [Mem],AX through the pipeline processor of FIG. 2. Across the top of the table the pipeline stages discussed with reference to FIG. 2 are shown. Down the left side of the table are clock cycles 1–8. It should be understood that during any clock cycle, different stages of the pipeline may be operating on different micro instructions, in parallel.

Execution begins at clock cycle 1 where the macro instruction ADD [Mem],AX is fetched from the instruction cache 202 and placed into the instruction buffer 204.

During clock cycle 2, the translator 206 reads the contents of the instruction buffer 204, decodes the macro instruction ADD [Mem],AX contained therein, and begins generating the appropriate micro instruction sequence. The first micro instruction in the sequence is LOAD [MEM]. This instruction is placed into the instruction register 210 before the end of clock cycle 2.

During clock cycle 3, the translator 204 places the next micro instruction in the sequence (ADD [Mem],AX) into the instruction register 210. Also during clock cycle 3, the LOAD [Mem] instruction proceeds to the register phase. During this phase, the register file 218 reads the sections 212 and 214 to retrieve register information which contain pointers relating to the linear memory address for [Mem]. The contents of the accessed registers are provided as outputs to temporary registers 222, 224 for use in later cycles.

During clock cycle 4, the translator 204 places the next micro instruction in the sequence (STORE [Mem]) into the instruction register 210. In addition, the register file 218 is accessed by the ADD [Mem],AX instruction to retrieve the data in the AX register and place it in one of the temporary registers 222, 224. And, the address stage of the pipeline calculates the effective address of [Mem] by providing the contents of the temporary registers 222, 224 and 226 as inputs to the ALU circuit 228. The output of the ALU 228 is provided to the address register 230 at the end of clock cycle 4.

During clock cycle 5, the STORE [Mem], enters the register stage. As with the LOAD instruction, the register file 218 may be accessed, as needed, to retrieve data needed to calculate the effective address of [Mem] in later cycles. Also during cycle 5, the ADD [Mem],AX micro instruction enters the address stage. No address calculation is required for this micro instruction. And, the LOAD [Mem] micro instruction enters the data stage. At this point, the data residing at the address pointed to by [Mem] is retrieved from either the data cache 240, if the data is cached, or from the memory 242, if the data is not cached. The address used to retrieve the data is found in the address register 230, as calculated in the previous cycle. The retrieved data is placed into the result register 238. In addition, the data is provided to temporary registers 222, 224, 232, and 234 by the forward/bypass bus 246 for access by the next instruction in the pipeline, as needed.

During clock cycle 6, the LOAD [Mem] micro instruction has reached the write back stage. The LOAD instruction causes the data retrieved from the memory 242 to be written into the register file 218. Also, the ADD [Mem],AX micro instruction has reached the data stage. At this point, the value retrieved from register AX in the register file 218 has been retrieved and placed into one of the temporary registers 232, 234. Also, the contents of [Mem] have been retrieved, and via the forward/bypass bus 246, have been provided to one of the temporary registers 232, 234. These two registers are used as inputs to the ALU 236 which performs the operation requested, i.e., ADD, and produces a result which is stored into the result register 238. In addition, the result of the ADD is also placed on the forward/bypass bus in the manner discussed above. Finally, the STORE [Mem] instruction resides in the address stage. At this point, the address for [Mem] is calculated by the ALU circuit 228 and provided to the address register 230.

During clock cycle 7 the ADD instruction proceeds to the write back stage. The ADD instruction causes the result stored in the result register 238 to be written into the register file 218. The STORE [Mem] instruction proceeds to the data stage. The address contained in the address register 230 is used to write the result of the add from the result register 238 into the location [Mem].

During clock cycle 8, the STORE [Mem] instruction proceeds to the write back stage where execution of the macro instruction ADD [Mem],AX is complete.

The above discussion provides an understanding of the operation of a pipeline processor in executing micro instructions, particularly micro instructions which perform an add operation on two operands, one located in a register file, the second located in memory, with the result stored in memory. Similar operations may be performed, such as subtract, and, compare, etc., with similar operands located in the register file and in memory. What should be understood, at this point, is that when a macro instruction operates on two operands, one in memory and one in a register file, and the destination for the result is in memory, it is necessary to first load the value from memory into a temporary register, then perform the operation, then store the result in memory. This is because the ALU 236 must use registers as inputs, and not memory locations. Thus, separate load and store micro instructions are generated around the operation instruction, i.e., ADD, to retrieve the data in memory into a temporary register, and later to store the result into memory. These separate load and store operations are placed before and after the operation instruction, and require the pipeline to calculate the address for the memory operand twice.

Figure 1:
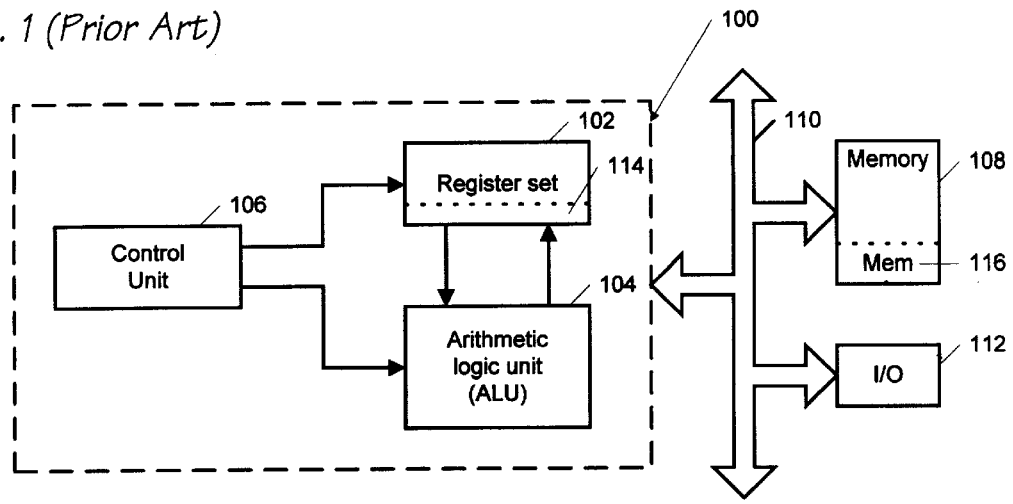
FIG. 1 is a block diagram of a prior art central processing unit (CPU).
Figure 6:
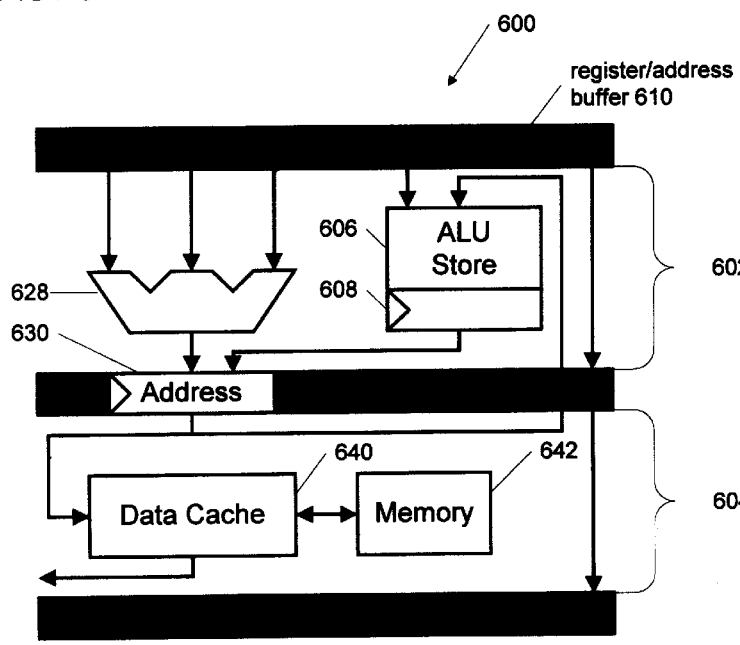
FIG. 6 is a block diagram of circuitry which ncorporates the present invention.
Figure 5:
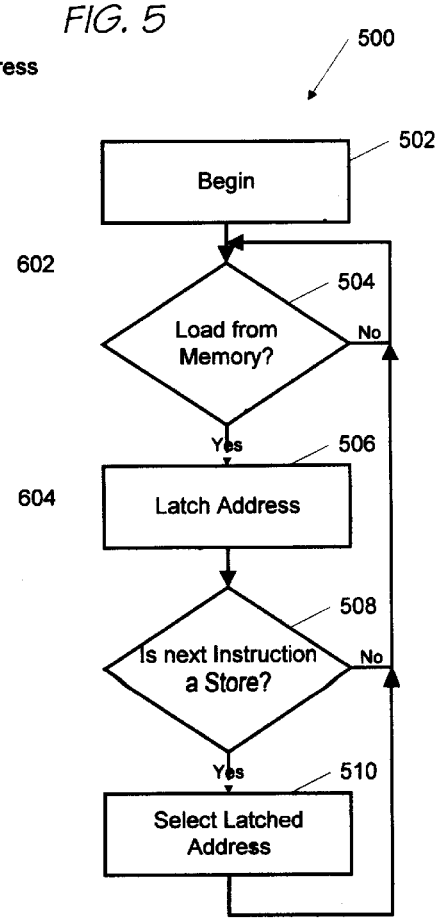
FIG. 5 is a flow chart illustrating the state sequence for the ALU Store circuit of FIG. 6.

What will now be shown, with reference to FIGS. 4, 5 and 6, is a method and apparatus which reduces the number of micro instructions, or clock cycles, required for performing the above operation to just two.

Now referring to FIG. 4, a table is provided which shows progress of the ADD [Mem],AX instruction through the pipeline. The pipeline stages are the same as discussed in FIG. 3. The clock cycles are indicated down the left side. What has changed, however, is that only two micro instructions are generated by the translator to perform the macro instruction. First, a LOAD [Mem] micro instruction is provided to retrieve the contents from memory, and place them into a temporary register. Second, an ADD.S [Mem], AX micro instruction is provided. This instruction performs the add operation, as requested, but also performs the function of the STORE micro instruction of FIG. 3.

Referring to FIG. 6, a portion 600 of a pipeline processor is shown. The portion 600 shows elements of an address stage 602 and a data stage 604. Within the address stage 602 is an ALU Store circuit 606 having a register 608. The ALU Store circuit 606 is connected to the register/address buffer 610 to allow the ALU Store 606 to monitor the micro instructions that proceed through the pipeline. The ALU Store 606 can provide an output to the address register 630. Operation of the ALU Store 606 will be discussed with reference to FIG. 5.

In FIG. 5, a flow chart 500 is shown which illustrates the states performed by the ALU Store 606. Operation begins at block 502. At decision block 504, the ALU Store 606 monitors the micro instruction in the pipeline to determine whether a LOAD from memory is being performed. If a LOAD is not being executed, flow proceeds back to decision block 504, and remains until a LOAD is detected. If a LOAD is being performed, flow proceeds to block 506.

At block 506, the address of the LOAD instruction, i.e, the address of [Mem], which has been calculated and stored in the address register 630 during the previous processor cycle, is latched into the register 608. Flow then proceeds to decision block 508.

At decision block 508, the ALU Store 606 monitors the pipeline to determine whether the next instruction after the LOAD contains information indicating that a STORE should occur. Such information may be provided by setting a bit in a control portion of a micro instruction, as indicated by the suffix S on the ADD instruction. If the next instruction does not contain indicia that a STORE should occur, flow proceeds back to block 504. If, however, the next instruction does contain indicia for a STORE, then the latched address in register 608 is provided to the address register 630. This address may then be used to write the result of the operation, i.e, the ADD, from the result register back into either the data cache 640, or the memory 642.

Thus, by providing an ALU Store 606 to monitor micro instruction sequences, by latching addresses associated with LOAD micro instructions, and by using the latched address if the next micro instruction contains STORE indicia, a macro instruction using an operand in memory, and providing a result in memory, can be reduced to just two micro instructions, and thus just two clock cycles.

Figure 7:
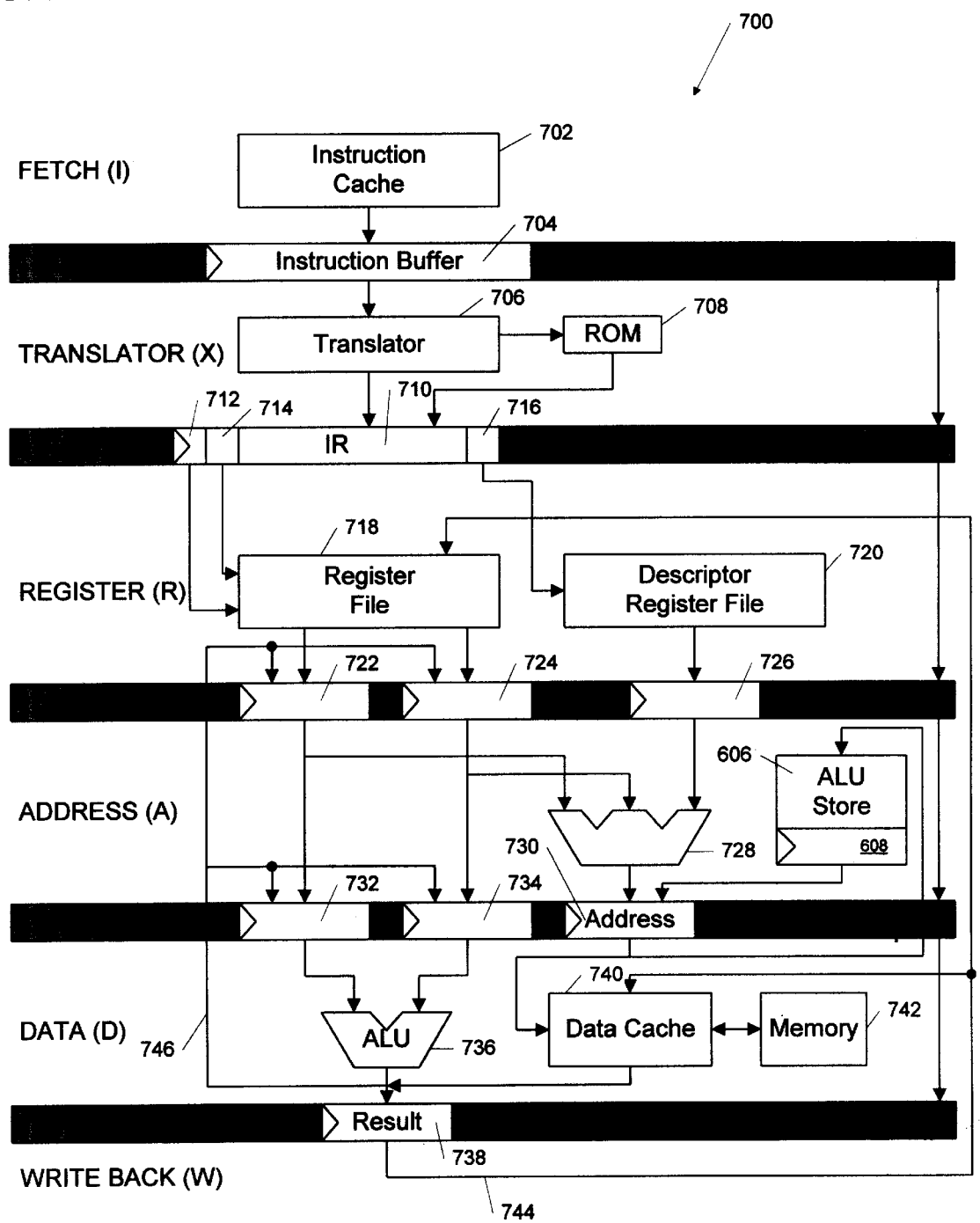
FIG. 7 is a block diagram illustrating the data path of a pipeline processor which incorporates the present invention.

Now referring to FIG. 7, the ALU Store 606 is shown within a pipeline processor 700. Like numbers referenced in FIGS. 2 and 6 are shown with the 700 prefix.

Although the present invention has been described in considerable detail with reference to certain preferred versions thereof, other versions are possible. For example, the micro instruction sequence of FIG. 4 may be provided by the ROM 708 rather than the translator 706. In addition, the ALU Store 706 may be placed in a different stage of the processor 700. Furthermore, as multiple issue processors become more prominent, there will not necessarily be a need to have the LOAD micro instruction immediately proceed the operation.store micro instruction.

Although the present invention and its advantages have been described in detail, it should be understood that various changes, substitutions and alterations can be made herein without departing from the spirit and scope of the invention as defined by the appended claims.

We claim:

1. A microprocessor for executing instructions, including a macro instruction having a source operand at an address in memory, and a result to be stored at the address in memory, the macro instruction being performed by two micro instructions, a first micro instruction for loading the source operand, and for latching the address of the source operand, and a second micro instruction for operating on the source operand to produce the result, and for storing the result to memory using the latched address, the second micro instruction containing indicia that the result is to be stored in memory at the latched address, the microprocessor comprising:

a memory, for storing the source operand, and subsequently the result at the address;

an ALU circuit, for calculating the address in memory of the source operand, upon execution of the first micro instruction, and for storing the address into a first address register for use by the first micro instruction;

an ALU store circuit, coupled to said ALU circuit, the ALU store circuit comprising:

ALU store logic, for monitoring execution of the two micro instructions, and for latching the address calculated by said ALU circuit;

a second address register, coupled to said ALU store logic, for holding the address latched by said ALU store logic; and an output, for selectively providing the address held in said second address register to said first address register;

wherein said ALU store circuit selectively provides the address held in said second address register to said first address register during execution of the second micro instruction, if the second micro instruction contains the indicia.

2. The microprocessor as recited in claim 1 wherein the macro instruction is an x86 processor Load-ALU-Store instruction.

3. The microprocessor as recited in claim 1 wherein said memory is an on-chip cache.

4. The microprocessor as recited in claim 1 wherein said ALU circuit comprises an arithmetic logic unit for performing arithmetic operations to calculate the address.

5. The microprocessor as recited in claim 1 wherein the indicia comprises a suffix attached to the second micro instruction for indicating that the address required by the second micro instruction is stored in said second address register.

6. The microprocessor as recited in claim 1 wherein the second micro instruction performs both an ALU operation to produce the result and a store operation to store the result said memory.

7. The microprocessor as recited in claim 6 wherein said ALU operation is performed in a first pipeline stage (an ALU stage) of the microprocessor, and said store operation is performed in a following stage of the microprocessor.

8. The microprocessor as recited in claim 7 wherein the second micro instruction that performs both said ALU operation and said store operation, exists in only one pipeline stage of the microprocessor at a time.

\* \* \* \* \*